United States Patent [19]

Morrison

[11] Patent Number: 5,073,968
[45] Date of Patent: Dec. 17, 1991

[54] METHOD AND APPARATUS FOR MARKING EMULATION ANALYSIS STATES

[75] Inventor: Robert D. Morrison, Colorado Springs, Colo.

[73] Assignee: Hewlett-Packard Company, Palo Alto, Calif.

[21] Appl. No.: 230,807

[22] Filed: Aug. 9, 1988

[51] Int. Cl.⁵ .................... G06F 11/00; G06F 11/28
[52] U.S. Cl. .................... 395/500; 364/927.81; 364/933.8; 364/944.92; 364/267; 364/DIG. 2
[58] Field of Search ... 264/200 MS File, 900 MS File; 371/19

[56] References Cited

U.S. PATENT DOCUMENTS

| | | | |
|---|---|---|---|
| 4,205,370 | 5/1980 | Hirtle | 364/200 |
| 4,419,368 | 1/1984 | Kurii | 364/200 |
| 4,488,228 | 12/1984 | Crudele et al. | 364/200 |
| 4,598,364 | 7/1986 | Gum et al. | 364/200 |
| 4,636,940 | 1/1987 | Goodwin, Jr. | 364/200 |
| 4,636,941 | 1/1987 | Suko | 364/200 |
| 4,694,420 | 9/1987 | Pettet et al. | 364/900 |
| 4,783,762 | 11/1988 | Inoue et al. | 364/900 |
| 4,802,165 | 1/1989 | Ream | 371/19 |
| 4,835,675 | 5/1989 | Kawai | 364/200 |

Primary Examiner—Stuart N. Hecker
Assistant Examiner—Rebecca L. Rudolph
Attorney, Agent, or Firm—Karl E. Bring

[57] ABSTRACT

Additional memory for holding marking tags is used for providing additional information regarding states acquired by an emulator during tracing for dequeueing. The marking tags are determined according to a predetermined coding scheme, loaded in a marking memory, and acquired during tracing along with the fetched instruction states. The combination of addresses, data, status, and the additional marking tags is converted into a list of states which correspond to the test program executed by the target processor means.

7 Claims, 6 Drawing Sheets

METHOD AND APPARATUS FOR MARKING EMULATION ANALYSIS STATES

BACKGROUND OF THE INVENTION

This invention relates to emulation systems (emulators) used for developing microprocessor-based systems, and specifically to techniques and hardware for providing additional marking in memory to emulation analysis states used in emulators for analysis purposes during dequeueing and tracing operations.

Emulators aid the development of microprocessor-based systems (target systems) by providing means for designers to load and run software (target programs) before any hardware is built The emulator may substitute for part or all of the target system. Emulators may be connected to the target system at any point in the system's development. FIG. 1 is a block diagram of a generic microprocessor-based system, having microprocessor 10, memory 12, and input/output device 14. FIG. 2 is a block diagram of an emulation system, having emulator 18, host computer 20, and user terminal 22. FIG. 3 is a block diagram of an emulator connected to a microprocessor-based system. The emulator is plugged into the microprocessor socket 16 in the target system in place of microprocessor 10 shown in FIG. 1, and is supported by host computer 20. The emulator provides the microprocessor functions and some of the memory for the target system, since the user may not have any or all the target system memory functioning. As the development approaches completion, functions performed by the emulator are gradually transferred to the target system. During the development, the emulator provides additional microprocessor controls not usually available which are useful for troubleshooting target software problems, including: single stepping, break points for certain memory addresses, break points on improper memory accesses, displaying and modifying internal registers, etc.

One particular microprocessor control which is useful is called "instruction analysis". Instruction analysis consists of "tracing", which is the acquisition of a collection of states during execution of a target program; and disassembly, which is the analysis of the acquired collection of states following the execution of the target program by the microprocessor. Instruction analysis attempts to recreate the actual instruction process. The standard method of acquisition examines the instructions fetched prior to execution to acquire state information, which usually includes the address, data and status information of a single microprocessor cycle. However, there may be a significant difference between the instructions that are fetched and the instructions that are executed. The process of attempting to recreate instruction execution from instruction fetches is called "dequeueing".

One dequeueing method taught in the prior was called "hardware dequeueing". This method of dequeueing was an attempt to recreate the microprocessor queue with circuitry. This was difficult to accomplish, therefore time consuming and expensive, and not always accurate. Each hardware dequeuer was dependent upon the architecture of the target processor and consequently this difficult task was repeated for every design of a new emulator. Critical information about microprocessor architecture required for design was often not available, and many other processors had queues which could not be recreated in this manner.

A second dequeueing method taught in the prior art was known as "software dequeueing". This method of dequeueing would attempt to recreate the microprocessor queue by decoding the instruction fetch information captured in a trace. This method was substantially cheaper to implement than the hardware method of dequeueing, but had severe accuracy problems. A major reason for accuracy degradation was difficulty in dequeueing branch or conditional branch instructions, because branches in a queued microprocessor caused multiple unused instruction fetches, which resulted in the execution of instructions in a different order than the instruction fetch order. Other instructions included single words, double words, or long words (quadruple words), and instructions which had an argument (operand) associated with the instruction (as in an "add constant" instruction). Since decoding of the instruction fetch information typically began at a point chosen within the target program by the user, there was no method of determining that the first word was also the beginning of an instruction. If the first word was not the beginning of an instruction, the dequeuer would regardless interpret it as the beginning of an instruction. The frequent result was that the decoded instruction fetch information bore little resemblance to what was actually being executed by the processor in the target program. Consequently, the "software dequeueing" solution, although much less expensive than the "hardware dequeueing" solution, was extremely unreliable.

SUMMARY OF THE INVENTION

In accordance with the preferred embodiment of the present invention, improved instruction analysis in emulators results from providing additional memory in an emulator which hold marks determined according to a predetermined coding scheme corresponding to instructions from a target program; the marks provide additional state information to the host controller of the emulator during instruction analysis for more accurate conversion of state information generated during target processor execution of the target program into a list of states which correspond to the test program executed by the target processor means.

The marking system may be applied to any processor and according to any predetermined coding scheme such that the maximum results may be achieved with a minimum of additional cost.

The additional cost of the memory and the necessary software for marking is low, therefore providing an advantage over the relatively high cost prior art hardware dequeueing solution; while the accuracy of the resulting trace information approaches that of the hardware dequeueing solution, providing an advantage over the prior art software dequeueing solution.

DETAILED DESCRIPTION OF THE PREFERRED EMBODIMENT

Figure 2:
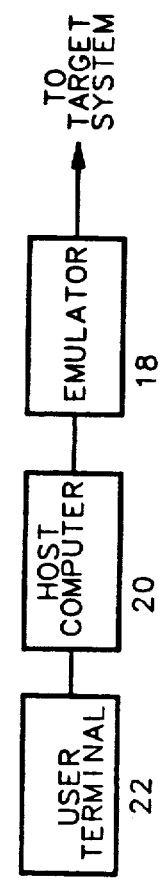
FIG. 2 is a block diagram of an emulation system (emulator).
Figure 1:
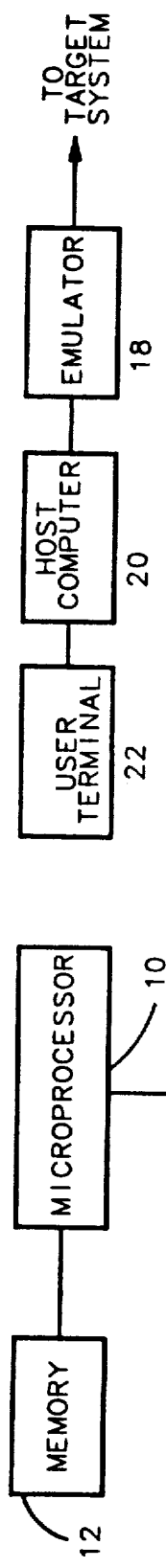
FIG. 1 is a block diagram of a generic microprocessor-based system under development (target system).
Figure 3:
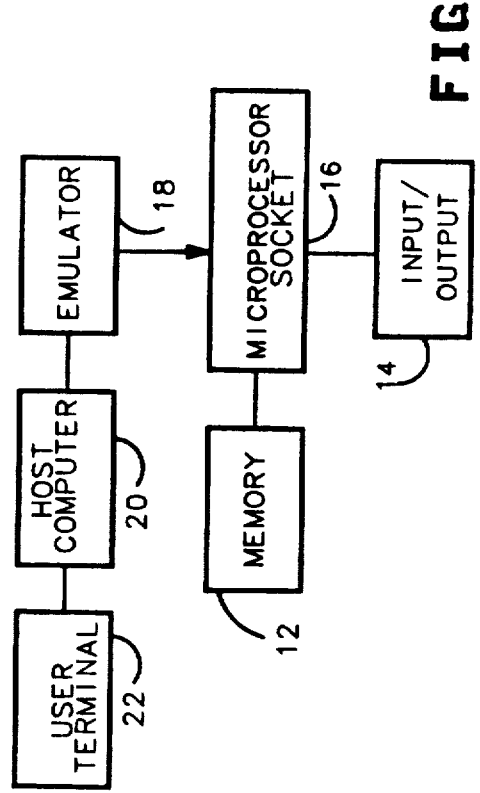
FIG. 3 is a block diagram which shows an emulation system connected to a microprocessor-based system under development.
Figure 4:
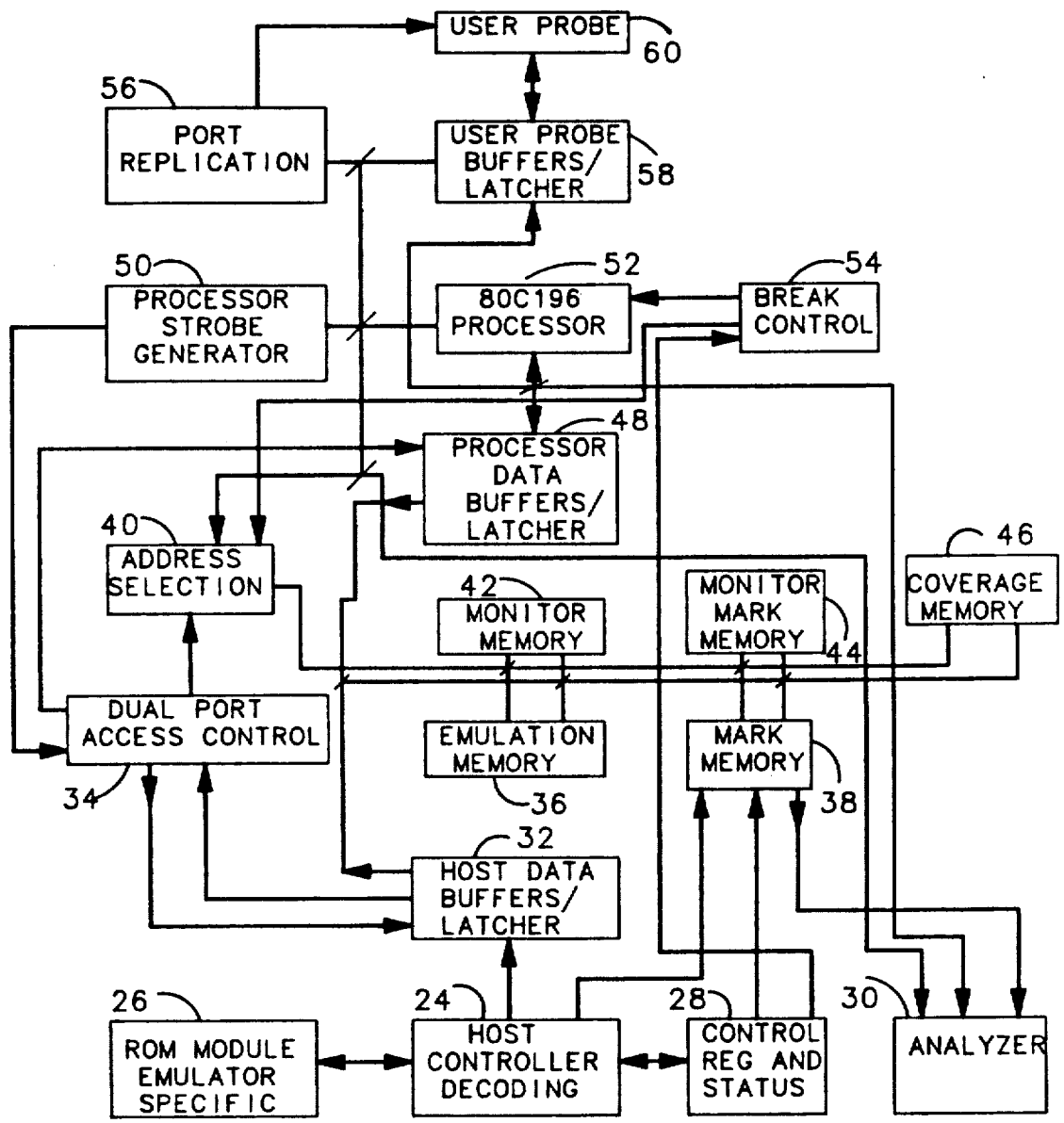
FIG. 4 shows a block diagram of the preferred embodiment of an emulator having marking hardware.

FIG. 4 shows a block diagram of the preferred embodiment of an emulator having marking hardware. The description of each block is provided below.

Host Controller Decoding Block 24

This block receives host controller commands and generates appropriate signals for various blocks in the emulator. For example, if a load mark command is sent to this block, it will generate a write strobe to a dual port access control 34, a mark address block signal to the address selection block 40, and an enable signal to the mark memory block 38. This block also reads status from the control register and status block 28 and can write information to the control register of the same block.

ROM Module 26 (emulator specific)

This block contains all of the emulator specific software necessary to operate the emulator. For example, all of the marking specific software is present in this ROM, as well as software to generate breaks, read registers, configure the emulator, and so on.

Control Register and Status Buffer 28

This block contains the emulator control register, which configures the emulator for various modes of operation. For example, it contains the reset signal, which will place the emulator in a initialized (reset) state when the signal is asserted. This block also contains the status register, which can be read any time by the host controller decoding block 24 to determine what state the emulator is in (for example, running in foreground or reset in background).

Analyzer 30

This clock receives the addresses, data and status emitted by the processor 52 (80C196) for storage and later examination. It also receives the marks emitted by the mark memory, which provides substantial information on opcode location.

Host Data Buffers/Latches 32

This block works in conjunction with the dual port memory access control to allow the host controller to access the same memory that the processor 52, which for this embodiment is a 80C196, can access. It buffers and latches host controller data to the various memory blocks for use at the appropriate time.

Dual Port Access Control 34

This block arbitrates the accesses from the host controller and the processor 52 so both can gain access to the various memory blocks, such as the emulation memory 36 and monitor memory 42. It generates the read and write strobes to the memory blocks and also generates the required timing wait signals back to the requesting blocks.

Emulation Memory 36

This block contains the memory used when the processor is running in foreground emulation memory.

Mark Memory 38

This block contains the memory used to hold the mark tags. This memory is loaded only by the host controller decoding block 24 (the 80C196 processor 52 cannot write to it) and is read only by the analyzer 30. The host controller decoding block 24 loads the mark tags at specific addresses of the mark memory 38, so when the processor 52 puts out identical addresses, the desired mark tags will be sent to the analyzer 30. Mark memory 38 is initialized to null tag values (unmarked) when the emulator is initialized or if an emulation memory location is modified after being marked.

Address Selection Block 40

This block works in conjunction with the dual port access control 34 to provide valid addresses to the various memory blocks at the appropriate times. It will select the correct memory block to write to and the address appropriate for that block.

Monitor Memory 42

This block contains the memory used when the processor 52 is running in background emulation memory. This memory contains the monitor code and contains the communication memory area used to communicate with the host controller decoding 24.

Monitor Mark Memory 44

This block contains marks which are used for proper operation of the monitor. Signals in this memory 44 control accesses to foreground memory while in the monitor and also control exit from the monitor (background) state.

Coverage Memory 46

This memory block contains information about address location access status. It can be reset by the host controller decoding block 24.

Processor Data Buffers/Latches 48

This block works in conjunction with the dual port memory access control 34 to allow the 80C196 processor 52 to access the same memory that the host controller decoding 24 can access. It buffers and latches 80C196 processor data to the various memory blocks for use at the appropriate time.

Processor Strobe Generator 50

This block intercepts the processor strobes to generate strobes with more appropriate timing and function for use throughout the emulator, such as timing strobes for the dual port access control 34 and for the analyzer 30.

Processor 52 (80C196)

This is the target processor which runs the target program as well as the monitor and other functions.

Break Control 54

This block can cause interruption of execution of the user's code at desired times to perform monitoring of registers and memory or to perform modification of the current state of the 80C196 processor 52. The interruption is carefully done so that restoration of the current state can be accomplished when exiting the monitor (background) state.

Port Replication 54

This block simulates the operation of the 80C196 processor port pins by duplicating internal functionality of the processor 52. This allows the emulator user probe to functionally act as the 80C196 processor 52 would while other functions are actually going on internally in the emulator.

User Probe Buffers/Latches 58

This block does the necessary memory address/data bus control to permit execution of code which is resident on the users target system (the system that the emulator is plugged into).

User Probe 60

This is the physical unit which plugs into the users target system. The user removes the 80C196 processor from his target system and plugs the user probe 60 of the emulator in its place.

The preferred embodiment of the marking hardware uses four distinct software blocks for creating and interpreting marks. An options module is used to define various options for use in creating the marks. Two modules are used in creating the marks: a syntax module for testing for appropriate ranges of addresses; and a state machine module for extracting opcode information, generating marks, and storing the marks in memory at the appropriate locations. A marking software disassembly module is the fourth module and is used for extracting the marks and using it to generate disassembled opcode information.

Figure 5:
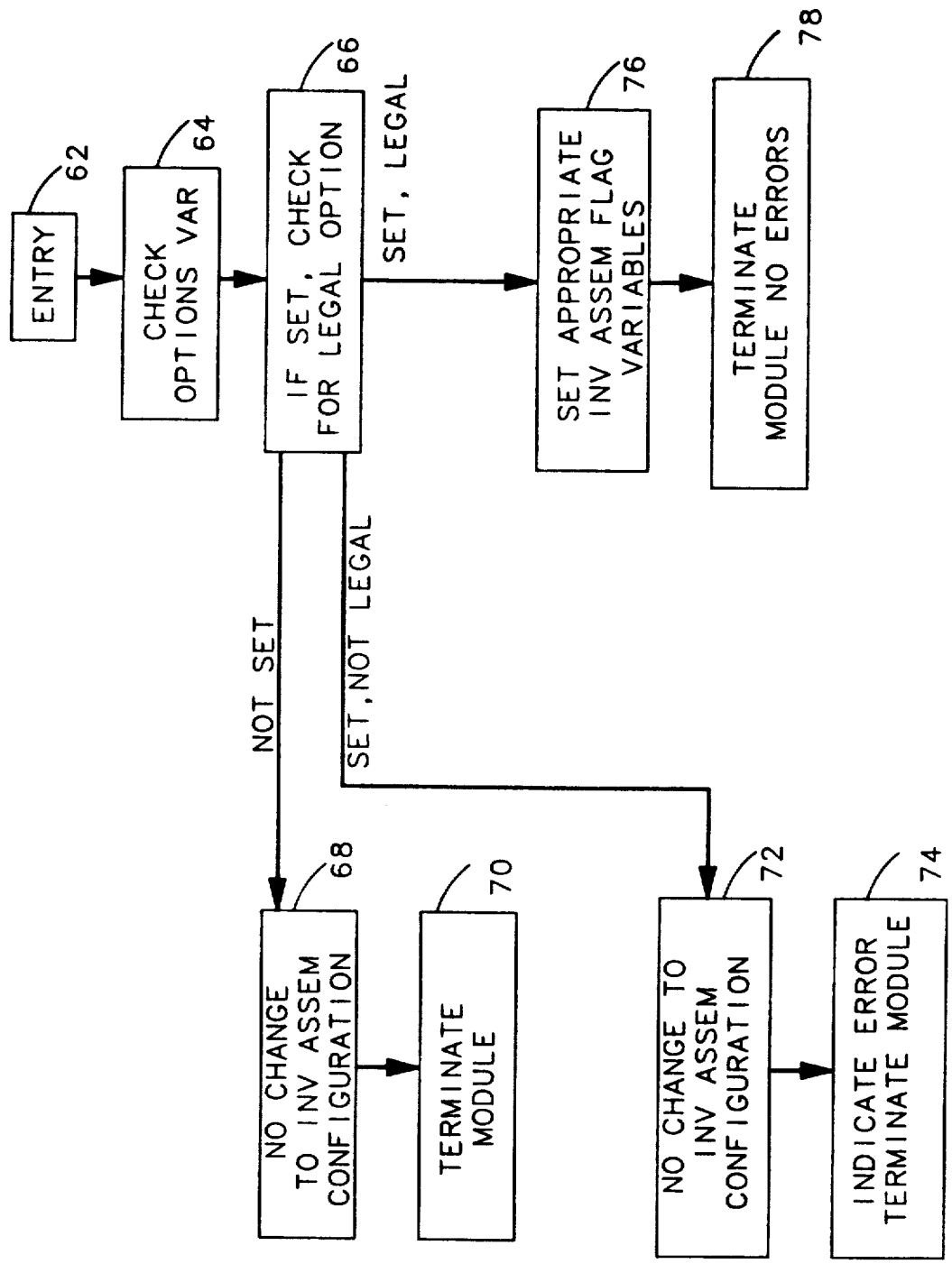
FIG. 5 shows a flowchart of the marking software options module.

FIG. 5 shows a flowchart of the options module. This module is invoked by the inverse assembler prior to disassembling the analysis states to implement the various options chosen by the user. After the user accesses the module (block 62), the options variables are checked to determine if a change has been made to the inverse assembly configuration (block 64). If the options variables are not set, no change is made to the inverse assembly configuration (block 68), and the options module terminates (block 70). If the options variables are set, the variables are then tested to determine if the chosen options are legal (block 66). If the options variables are not legal, then no change is made to the inverse assembly configuration (block 72), an error is indicated to the user, and the options module terminates (block 74). If the options variables are valid, then the appropriate inverse assembler flag variables are changed (block 76) and the options module terminates (block 78).

Figure 6:
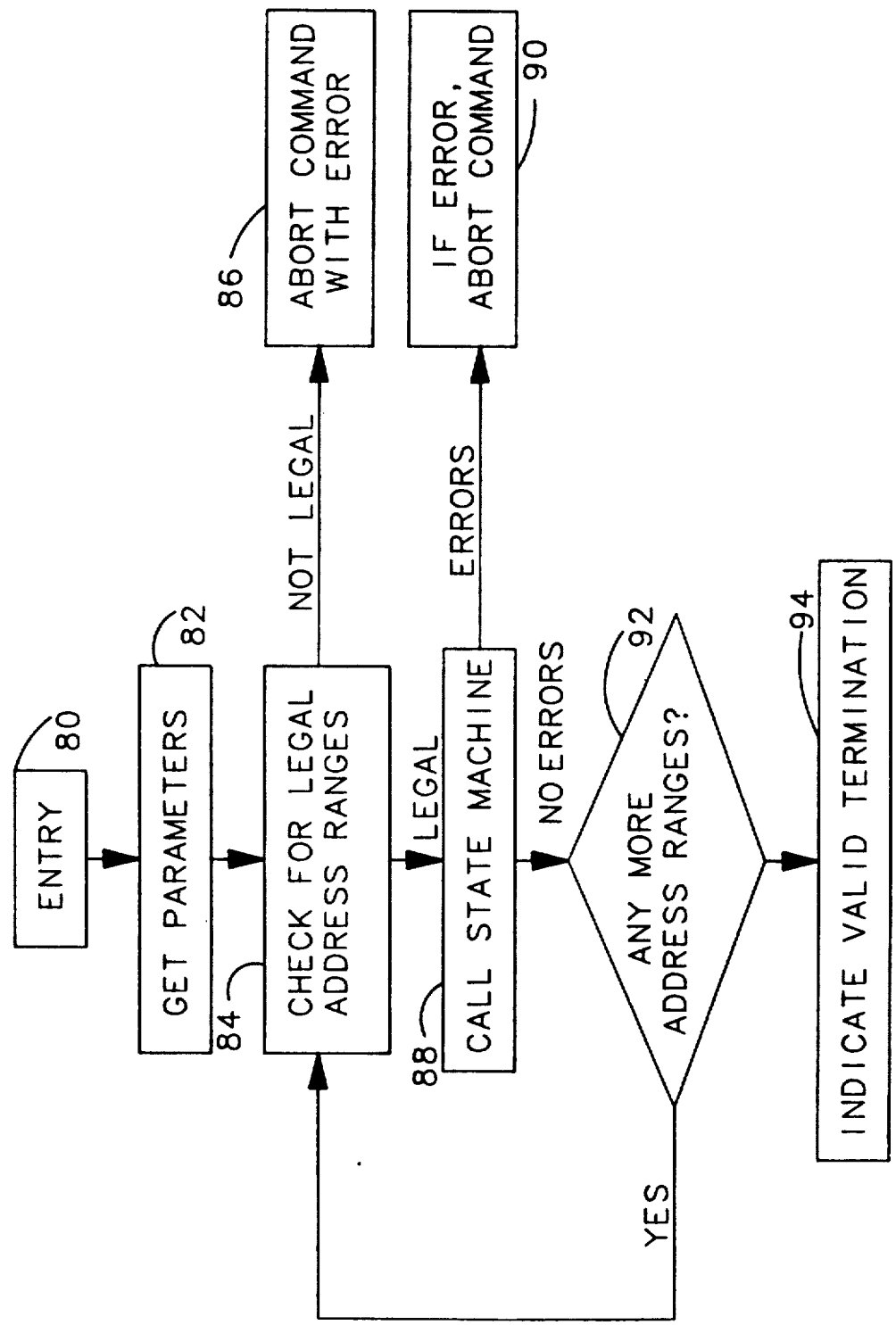
FIG. 6 shows a flowchart of the marking software syntax module.

FIG. 6 shows a flowchart of the syntax module. If a mark command is implemented, the syntax module is called (block 80). First, the parameters of the command are acquired (block 82), and a check is made for valid address ranges (block 84). If the ranges are not valid, the command is aborted, an error is indicated to the user, and the syntax module terminates (block 86). If the ranges are valid, the marking software state machine module is called (block 88). If the state machine module returns an error condition from a problem within the state machine module, an error is indicated to the user and the command is aborted (block 90). If no error is returned by the state machine, the state machine module returns after placing the appropriate marks in memory for the range of addresses. The syntax module determines if additional ranges of memory are specified to be marked (block 92). If additional ranges of memory are to be marked, the validity of the ranges is determined (block 84). If no additional ranges of memory are to be marked, the syntax module indicates no error to the user, and terminates (block 94).

Figure 7:
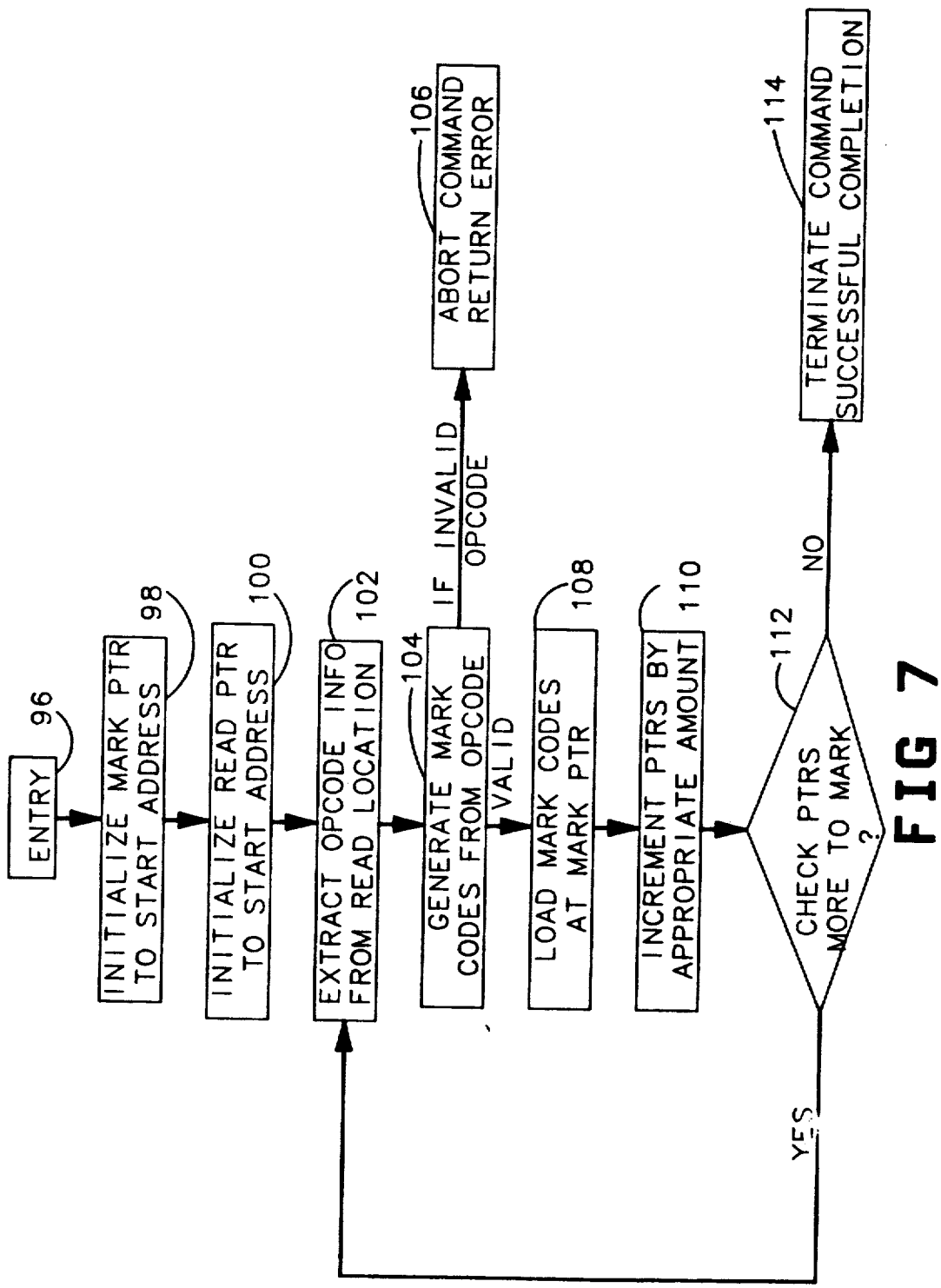
FIG. 7 shows a flowchart of the marking software state machine module.

FIG. 7 shows a flowchart of the marking software state machine module. After this module is called by the syntax module described above (block 96), the mark pointer is initialized to the beginning address for the range of addresses to be marked, or start address (block 98). The read pointer is also initialized to the start address (block 100). The opcode information is extracted from the location indicated by the read pointer (block 102) and the appropriate mark code is generated by referencing a lookup table (block 104). This lookup table contains a predetermined coding scheme for marking emulation analysis states. For this embodiment, the processor is assumed to use two bytes for a maximum size instruction fetch, and three bits are used for marking with the following definitions:

000—null (has not been marked or has been affected)
001—low byte is the only opcode
010—high byte is the only opcode
011—both bytes are opcodes
100—neither byte is an opcode but it is marked The remaining definitions are not used. If the opcode is not valid, the mark command is aborted and an error is returned to the syntax module (block 106). If the opcode is valid, the referenced mark is loaded into mark memory at the location of the mark pointer (block 108). If the opcode information extracted is a valid non-opcode (operand), then non-opcode mark information is loaded into mark memory at the location of the mark pointer (block 108). The pointers are incremented by the appropriate amount as provided in the lookup table, which is dependent on the byte size of the opcode and operand, if any (block 110). Then the pointers are compared to the address range to determine if the mark command is to be terminated (block 112). If the range is not completed, the state machine module returns to earlier step of extracting the opcode information from the read location specified by the current position of the read pointer (block 102), and continues in the same manner as listed above. If the range is completed, the state machine module indicates successful completion to the user and terminates the mark command and the state machine module, returning to the syntax module (block 114).

Figure 8:
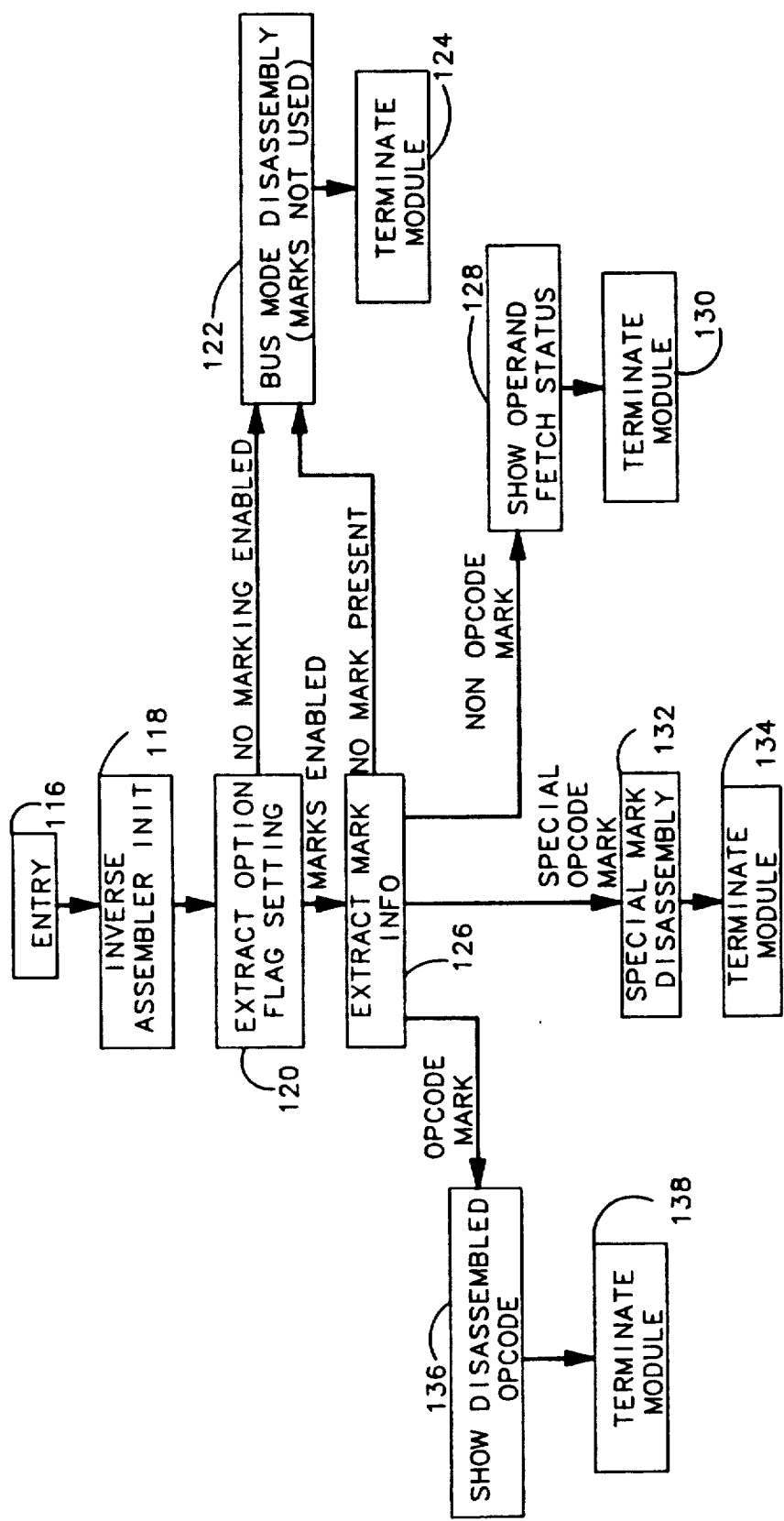
FIG. 8 shows a flowchart of the marking software disassembly module.

FIG. 8 shows a flowchart of a marking software disassembly module. This module is called by the user when a trace is implemented (block 116). The disassembly module is used to disassemble a single state and is called by a module which would repeatedly call the disassembly module for a series of states. The inverse assembler is first initialized (block 118). The option flag settings are extracted and tested to determine if marking is enabled for this command (block 120). If no marking is enabled, a software dequeueing method (or bus mode disassembly) is applied to determine the opcode or operand (block 122) and the disassembly module is terminated (block 124). If marking is enabled for this address, the mark information is extracted (block 126). If the extracted mark information shows no mark is present for this particular address, then the bus mode disassembly is applied (block 122) as discussed above. If the extracted mark information shows a mark is present for this particular address, then for this particular embodiment the mark is tested to determine if it is a non-opcode mark, a normal opcode mark, or a special opcode mark (block 126). If the mark is a non-opcode mark, then the operand fetch status is shown (block 128) and the module terminates (block 130). If the mark is a special opcode mark, for example a null opcode mark, a special mark disassembly is applied to determine and show the opcode (block 132), and the module is terminated (block 134). If the mark is a standard opcode mark, opcode disassembly is applied, the disassembled opcode is shown (block 136), and the module is terminated (block 138).

An example of marking is provided showing the code being traced, then the actual sequence of instructions executed, a trace list display with marking enabled, and a trace list display with marking disabled, similar to the prior art software dequeueing solution.

```
The two trace listings shown are of identical processor steps, the
first with marking enabled, and the second with marking disabled.
The code that is being traced is as follows:
    CMPB 1C, #41    ;Compare byte at register 1C to value 41H
    JE 42D          ;Jump if equal to address 42D
    CMPB 1C, #42    ;Compare byte at register 1C to value 42H
    JE 433          ;Jump if equal to address 433
    SJMP 43F        ;otherwise, jump to address 43F
42D LDB 1D, #12     ;load register 1D with value 12H
    LD 1E, #0512    ;load word register 1E with value 512H
    SCALL 443       ;Call routine at address 443
         .
         .
443 LD 20, #601     ;load word register 20 with value 601H
The actual instruction sequence is:
    CMPB 1C, #41    ;Compare byte at register 1C to value 41H
    JE 42D          ;Compare successful, so do the jump to 42D
42D LDB 1D, #12     ;Do the load register with value 12H
    LD 1E, #0512    ;Do the load word register with value 512H
    SCALL 443       ;Now call routine at address 443
443 LD 20, #601     ;Load word register 20 with value #601
        EXAMPLE OF TRACE WITH MARKING ENABLED
U>tl -om 4..16              ;command to display trace
                             with
Line  addr.H  80C196 Mnemonics.H
 4    041C    word inst fetch     ;fetch from previous in-
                                    structi
 5    041E    JE 042D             ;Shows the fetch of the
                                    Jump o
 6    0420    word inst fetch
 7    0422    word inst fetch     ;Note the jump to address
                                    42D
 8    042D    LDB 1D, #12         ;succeeded). Now is
                                    loading r
 9    042E    word inst fetch     ;1D with value 12H
10    0430    LD 1E, #0512        ;Now is loading word
                                    register
11    0432    word inst fetch     ;value 512H
12    0434    SCALL 0443          ;Now will do a call to
                                    address
13    0436    word inst fetch
14    0438    word inst fetch
15    06FA    word write = 0436   ;Stack fetch associated
                                    with t
16    0443    LD 20, #0601        ;Note is now executing
                                    at addr
        EXAMPLE OF TRACE WITH MARKING DISABLED
U>tl -ob 4..16              ;command to display trace
                             with
Line  addr.H  80C196 Mnemonics.H
 4    041C    AND OD, DF, [1C]    ;incorrect - tries to
                                    disassemb
 5    041E    word inst fetch     ;that is not an opcode,
                                    then s
 6    0420    SJMP 0438           ;correct opcode; cannot
                                    recove
 7    0422    LDB no operand,     ;states. Note that inv assem
                 prefetch?
 8    042D    LDB 1D, #12         ;Finally starts to
```

```
                                -continued
                                            correctly d
 9    042E    word inst fetch
10    0430    LD 1E, #0512        ;OK here, shows loading
                                    of wor
11    0432    word inst fetch
12    0434    SCALL 0443          ;gets confused after here
                                    beca
13    0436    SJMP 0408           ;aren't removed
14    0438    LDB no operand,     ;inv assembler is con-
                 prefetch?           fused aga
15    06FA    word write = 00436  ;not obvious what caused
                                    this
16    0443    LD 20, #0601        ;finally got back on track
                                    aga
```

The trace listing with marking enabled provides a very accurate representation of the actual instructions executed in the proper sequence. The marking tags provide additional state information for use during conversion to a list of states which correspond to the test program executed by the target processor means.

In contrast to the trace listing with marking enabled, the trace listing with marking disabled lacks sufficient information to correctly convert the state information to a list of executed instructions. The trace began on a non-opcode fetch at line 4 and disassembled the unexecuted byte as an executed AND command, and misses the first JE (jump if equal) command. Eventually, the trace listing recovers at line 8 and correctly identifies the LDB (load register) command. However, at line 13 and 14 errors occur again. The result is that it is difficult for the user to know when the trace listing is reliable, and when it is not. The use of marking, while not perfect, provides greatly improved reliability.

I claim:

1. An apparatus for use in instruction analysis for marking emulation states from a program under text and for recreating a list of instructions corresponding to at least a portion of the program under test from such emulation states, which program under test comprises a plurality of individual instructions, the apparatus comprising:

a memory for storing marks corresponding to the individual instructions in the program under test;

a target processor for executing the program under test and for transmitting emulation state information associated with the execution of individual instructions in the program under test;

an analyzer, connected to the target processor and the memory, for collecting the emulation state information from the target processor and for reading the marks from the memory; and a host controller, connected to the memory and the analyzer, for analyzing the emulation state information collected in the analyzer, prior to execution by the target processor, to generate marks associated with the individual instructions according to a predetermined coding scheme, wherein said marks provide an indication of the byte length of an emulation state, for storing the marks in the memory and for dequeing the emulation state information collected in the analyzer into a list of instructions corresponding to the individual instructions for at least a portion of the program under test, which dequeing occurs in response to the state information and the marks associated with a particular instruction, wherein when dequeing is to occur for emulation state information associated with a particular individual instruction the mark associated with that individual instruction is read from the memory into the analyzer.

2. The apparatus of claim 1, wherein the emulation state information comprises address, data, and status information.

3. The apparatus of claim 1, wherein the emulation state information comprises opcode information and wherein the host controller generates marks in relation to the opcode information.

4. The apparatus of claim 1, wherein each emulation state can comprise two bytes and wherein said marks provide an indication of the number of bytes constituting an emulation state.

5. A method for use in instruction analysis for marking emulation states from a program under test and for recreating a list of instructions corresponding to at least a portion of the program under test from such emulation states, which program under test comprises a plurality of individual instructions, the method comprising the steps of:

executing the program under test and transmitting emulation state information associated with the execution of individual instructions in the program under test;

collecting the transmitted emulation state information;

analyzing the collected emulation state information, prior to execution, and generating marks associated with the individual instructions according to a predetermined coding scheme, wherein said marks provide an indication of the byte length of an emulation state;

storing the marks in a memory; and reading the marks from memory and dequeing the collected emulation state information into a list of instructions corresponding to the individual instructions for at least a portion of the program under test, which dequeing occurs in response to the state information and the marks associated with a particular instruction, wherein when dequeing is to occur for emulation state information associated with a particular individual instruction the mark associated with that individual instruction is read from the memory.

6. The method of claim 5, wherein the emulation state information comprises address, data, and status information.

7. The method of claim 5, wherein each emulation state can comprise two bytes and wherein said marks are generated to provide an indication of the number of bytes constituting an emulation state.

* * * * *